United States Patent [19]
Benda et al.

[11] Patent Number: 5,427,733
[45] Date of Patent: Jun. 27, 1995

[54] METHOD FOR PERFORMING TEMPERATURE-CONTROLLED LASER SINTERING

[75] Inventors: John A. Benda, Amston; Aristotle Parasco, Bolton, both of Conn.

[73] Assignee: United Technologies Corporation, Hartford, Conn.

[21] Appl. No.: 139,392

[22] Filed: Oct. 20, 1993

[51] Int. Cl.$^6$ ............................ B22F 1/00; B29C 39/00
[52] U.S. Cl. ............................................. 419/1; 419/7; 419/10; 264/25; 264/40.1; 264/40.6
[58] Field of Search ............................ 419/7, 9, 1, 61; 219/121.61, 121.62, 121.76, 121.83, 121.81; 264/25, 40.1, 40.6; 156/62.2, 64, 89

[56] References Cited

U.S. PATENT DOCUMENTS

| | | | |
|---|---|---|---|
| 4,938,816 | 7/1990 | Beaman et al. | 156/62.2 |
| 5,026,964 | 6/1991 | Somers et al. | 219/121.7 |
| 5,155,321 | 10/1992 | Grube et al. | 219/121.6 |

Primary Examiner—Donald P. Walsh
Assistant Examiner—Anthony R. Chi
Attorney, Agent, or Firm—Gerald L. DePardo

[57] ABSTRACT

A temperature-controlled laser sintering system includes a laser beam 12 which is focussed onto a sintering bed 38 by a focussing mirror 26 and a set of scanning mirrors 32,34. Thermal radiation 114 emitted from the sintering bed 38 are imaged to the scanning mirrors and to a dichroic beamsplitter 110 which reflects such radiation but passes the wavelength of the laser beam 12. The radiation 118 is focussed onto an optical detector 126 which provides a signal on a line 128 to a power control circuit 104. The power control circuit 104 controls a modulator 100 which modulates the power of the laser beam 112 so as to maintain the thermal radiation emission 114 (and thus the temperature at the sintering location) at a substantially constant level.

7 Claims, 10 Drawing Sheets fig. 10
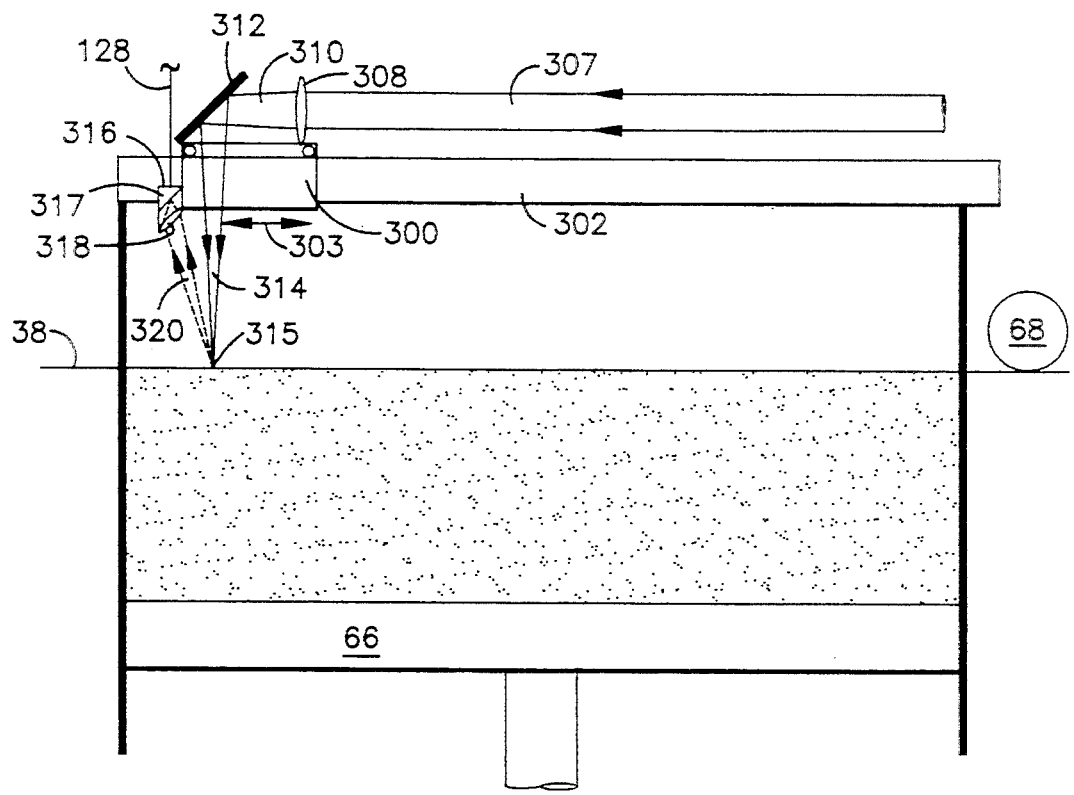
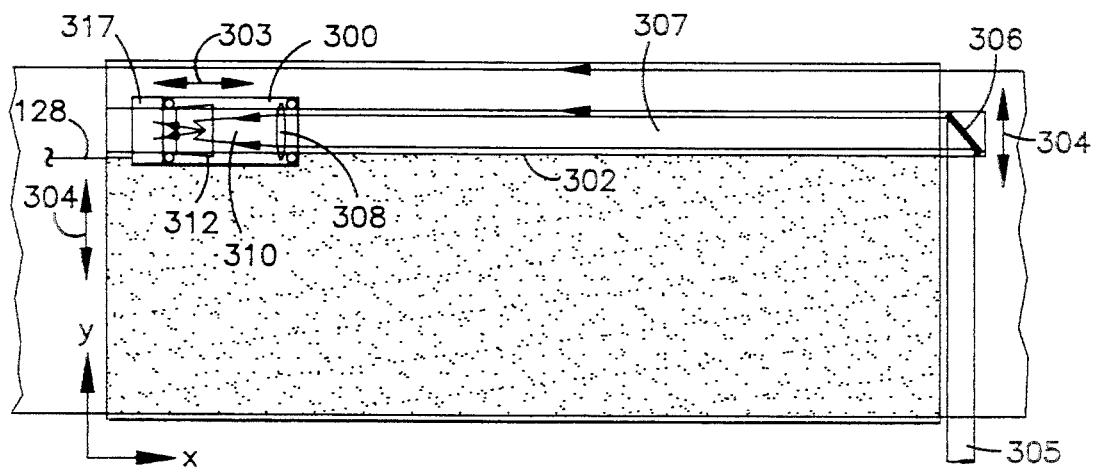
fig. 11

METHOD FOR PERFORMING TEMPERATURE-CONTROLLED LASER SINTERING

CROSS REFERENCE TO RELATED APPLICATIONS

Co-pending U.S. patent application Ser. No. 08/139375 now U.S. Pat. No. 5,393,482, entitled "Multiple Beam Laser Sintering", filed contemporaneously herewith, contains subject matter related to that disclosed herein.

TECHNICAL FIELD

This invention relates to laser sintering and more particularly to temperature-controlled laser sintering.

BACKGROUND ART

It is known in the art of stereolithography to perform rapid prototyping of product molds or the product itself. The stereolithographic approach, as is known, uses an ultraviolet laser to scan across and selectively polymerize a monomer (i.e., solidify a liquid plastic) to build up a prototype layer-by-layer and line-by-line from a predetermined model of a part. In particular, the laser is focused on a portion of a bath of liquid resin which causes the liquid to polymerize (or solidify) where the focal point of the laser contacts (or is incident on) the liquid. This technique allows a part to be rapidly produced that would otherwise take a long time to make through a molding process.

It is also known to do rapid prototyping using an infrared laser to perform selective laser sintering of a powder. Sintering, as is known, is a process in which the temperature of a powdered material is raised to its softening point by thermal heating with a laser, thereby causing the particles of the powder to fuse together in the heated region. The temperature level needed for sintering depends on the material being sintered; but the higher the temperature is, the quicker it sinters. For example, iron powder melts at 1500° C. but will sinter at 1000° C. if the powder remains at that temperature long enough.

In the sintering process, a laser beam at a substantially constant power level is incident on a powder bed and a lateral layer of the part is fabricated by repeated scanning of the laser beam in successive lines across a layer of powder until the entire layer has been scanned. The laser is turned on at points where the powder is to be sintered, otherwise, the laser is off. When one layer is complete, the surface of the sintering bed is lowered, another layer of powder is spread over the previous, now sintered layer, and the next layer is scanned. This process is repeated until the part is complete.

However, one problem with laser sintering is that, when a constant power laser is used, portions of the material overheat and melt excessively (resulting in trenches in the powder) and, in other areas, the powder does not completely fuse together. Such uneven sintering can cause part deformations, imprecise part dimensions, and uneven rigidity or strength of the part.

Thus, it would be desirable to devise a sintering system that obviates the pitfalls of current sintering schemes and provides an evenly sintered part.

DISCLOSURE OF INVENTION

Objects of the invention include provision of a laser sintering system which uniformly sinters a powder.

According to the present invention, an apparatus for laser sintering a powder includes a laser beam incident on a surface of the powder at a sintering location and detection means for detecting the temperature of the powder at a detection point near the sintering location.

According further to the invention, laser control means is provided, which is responsive to a detection signal indicative of the temperature from the detection means, for controlling the power of said laser beam.

According still further to the present invention, the laser control means comprises means for controlling the power of the laser beam so as to maintain the temperature at a substantially constant level. In still further accord to the invention, the detection means detects radiated thermal emissions from the detection point.

Further according to the invention, scanning means are provided for scanning the laser beam across the powder and optical means are provided for directing the radiated thermal emissions through the scanning means to the detection means.

The invention represents a significant improvement over the prior art by the discovery that the temperature rise at each laser location is effected by the presence of nearby sintered material due to changes in thermal conductivity and optical reflectivity of the nearby sintered regions. The invention provides temperature control at the sintering location by monitoring the infrared thermal radiation at the sintering location (i.e., where the laser is incident on the powder bed) and continually adjusts the laser power to maintain a substantially constant radiation emission, thereby providing a substantially constant sintering temperature. The invention provides for substantially consistent sintering at each sintering location by heating the powder enough to obtain fusion of the powder in the laser area but not so hot as to overheat the powder and cause excessive melting and the creation of trenches. Also, for moving scanning mirror sintering systems, the invention uses the same scanning mirrors to project (or image) the thermal radiation onto an optical detector, thereby providing temperature measurement without additional moving mirrors and the associated required synchronization.

The foregoing and other objects, features and advantages of the present invention will become more apparent in light of the following detailed description of exemplary embodiments thereof as illustrated in the accompanying drawings.

BRIEF DESCRIPTION OF DRAWINGS

FIG. 10 is a side view of an X-Y coordinate positioning system having a thermal emission sensor in accordance with the present invention.

FIG. 11 is a top view of the X-Y coordinate positioning system of FIG. 10 showing the thermal emission sensor in accordance with the present invention.

BEST MODE FOR CARRYING OUT THE INVENTION

Figure 1:
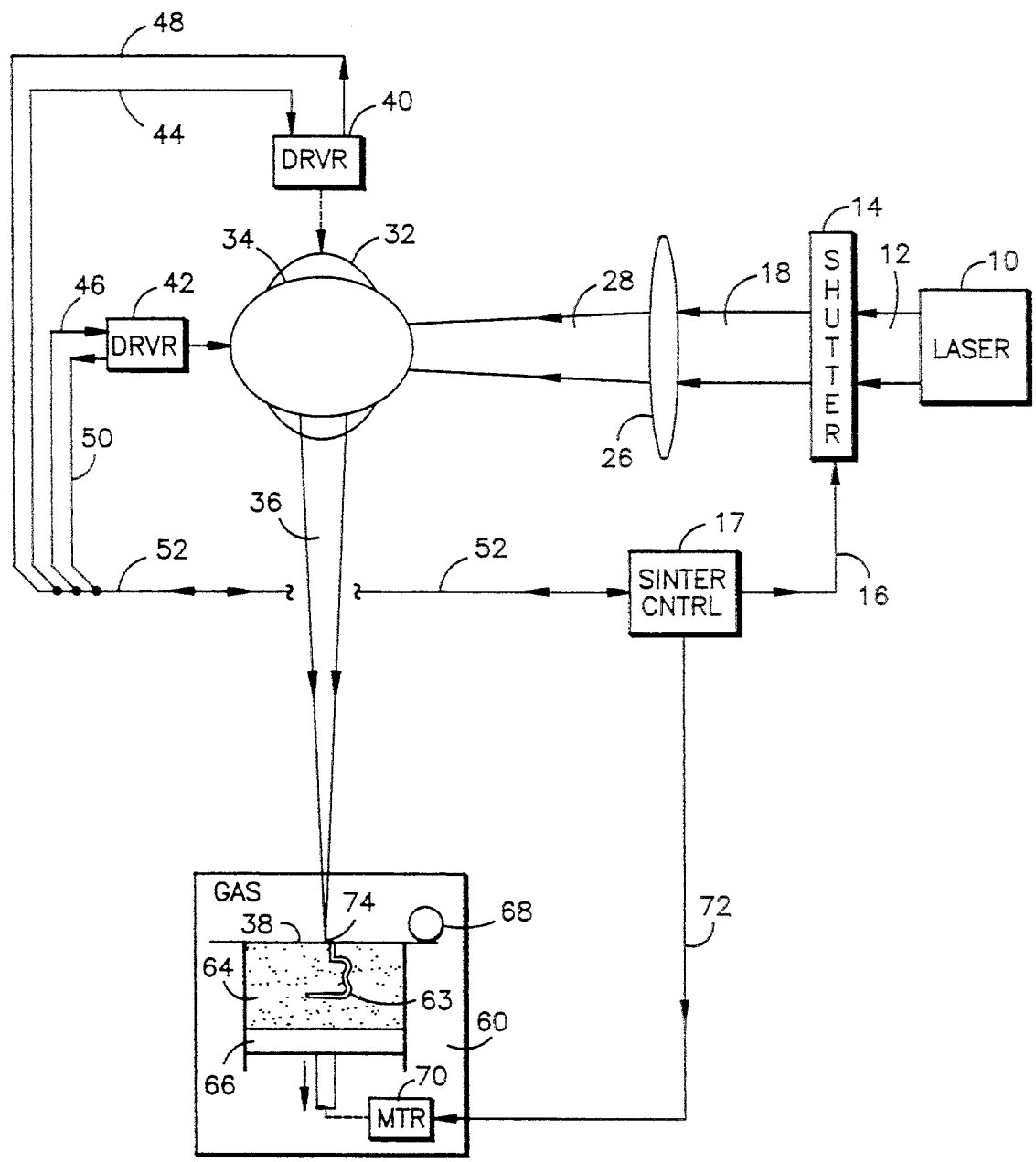
FIG. 1 is a schematic block diagram of a prior art sintering system.

Referring to FIG. 1, a prior art temperature-controlled sintering system comprises a laser 10 which provides an output beam 12 to a shutter 14 which is controlled by a signal on a line 16 from a sinter control circuit 17 (discussed hereinafter). The shutter 14 is a known device having an open and a closed state. In the open state, the light 12 is passed through the shutter 14 and exits the shutter 14 as a light beam 18. In the closed state, no light exits the shutter 14. The signal on the line 16 provides an open/closed signal to the shutter 14 to control the state thereof.

The light 18 is incident on a focusing lens 26 which provides a focused beam 28 which is incident on a pair of scanning mirrors 32,34. The mirrors 32,34 reflect the focused laser light 28 and provide a directionally controlled focused beam 36 which is focused onto the surface of a sintering powder bed 38.

The scanning mirrors 32,34 direct the output focused beam 36 to scan across lines on the powder bed 38 to selectively sinter desired locations.

The scanning mirrors 32,34 are driven by Galvanometric drivers 40,42, respectively, Model G325DT by General Scanning Inc, in response to drive signals on lines 44,46, respectively, from the sinter control circuit 17. The drivers 40,42 also provide position feedback signals on lines 48,50, respectively, to the sinter control circuit 17. The lines 44,46,48,50 are indicated collectively as a line 52 connected to the sinter control circuit 17.

The sintering process occurs in a chamber 60 having a predetermined gas or vacuum therein. Within the chamber 60 is a container 62 which houses powder 64 to be sintered at predefined locations to create a predetermined shaped part 63. The container 62 has a movable bottom portion comprising a piston 65 which sets the depth of the container 62. When a layer of powder has been sintered, the piston 66 is lowered and a roller 68 rolls more of the powder 64 across the powder bed 38 for sintering. The piston 66 is controlled by a motor 70 which is controlled by an electrical signal on a line 72 from the sinter control circuit 17.

The focused beam 36 is incident on the bed 38 at a point 74. The heat from the laser beam causes the powder particles 64 to fuse (or sinter) because the temperature is raised by the energy from the laser 36 (as discussed hereinbefore).

The sinter control circuit 17 provides the output signals on the line 16 to drive the shutter 14, on the line 72 to drive the motor 70 which drives the piston 66, and on the lines 44,46 to drive the scanning mirrors 32,34, respectively.

The sinter control circuit 17 positions the focused beam 36 on the powder bed 38 and controls the scanning of the focussed beam 36 across the powder bed 38. Additionally, the sinter control circuit 17 opens and closes the shutter 14 at the appropriate times to sinter predetermined sections of a scan to produce a given part.

The sinter control circuit 17 may likely be a digital computer having a layer-by-layer, scan-by-scan layout of the part to be produced, and determines when the laser beam should be turned on or off by the shutter 14. Many different techniques may be used for the sinter control circuit 17 and the type of control circuit used does not effect the present invention. The sinter control circuit 17 is well known in the art and will not be discussed further herein.

We have found that the laser power needed to fuse the powder in the area of the focussed beam depends on the sintered history of the previous layer of the powder. In particular, if the underlying powder has been sintered, its thermal conductivity will be higher than that of unsintered powder. Consequently, the laser power needed to raise the top layer of powder to the proper temperature for sintering to occur will be greater than if the underlying and nearby powder is unsintered. Also, if the laser beam is in a region which was recently scanned and sintered, the temperature may still be elevated from the previous scan thereby requiring less laser power to reach the appropriate sintering temperature. Still further, sintered material near the laser beam may reflect a portion of the laser beam more than the reflection from virgin powder, thereby also affecting the thermal heating of the powder by the laser.

Figure 2:
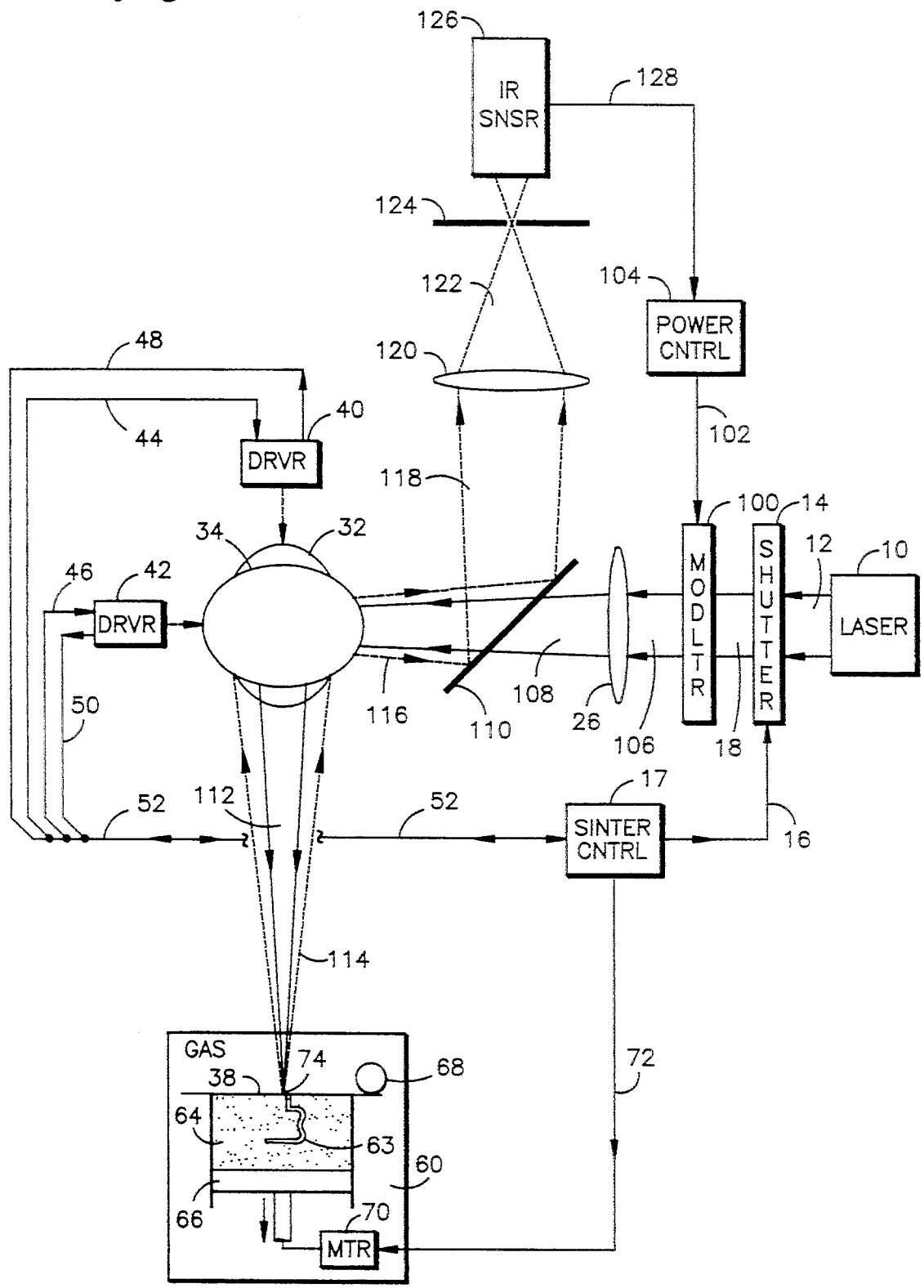
FIG. 2 is a schematic block diagram of a sintering system with thermal feedback control of laser power in accordance with the present invention.

Referring now to FIG. 2, in light of the above-mentioned discovery, we have also found that closed loop control of laser power based on radiated thermal emission from the laser focal point area provides substantially uniform sintering.

In particular, system is very similar to the prior art system of FIG. 1 with the following additional components. The laser 10 and shutter are in the same configuration as for FIG. 1. In particular, the laser is a $CO_2$ having a wavelength of about 10.6 microns, a power of about 100 watts, and a diameter of about 8 mm. Other lasers, wavelengths, powers, and diameters may be used if desired provided adequate heating occurs to produce sintering. The output light 18 from the shutter 14 is incident on an electro-optic modulator 100 which is located between the shutter 14 and the focussing lens 26 and is controlled by a signal on a line 102 from a power control circuit 104 (discussed hereinafter). The modulator 100 is a known device which modulates the optical power of the incident light 18 and provides an output light 106 having an output power which is modulated as a function of the signal on the line 102.

The light 106 is incident on the focusing lens 26 which provides a modulated focused beam 108 through a dichroic beamsplitter 110 which passes light at the laser wavelength onto the scanning mirrors 32,34. The scanning mirrors 32,34 provide a directionally controlled focused modulated beam 112 which is focused onto the surface of the sintering powder bed 38 in the same manner as discussed hereinbefore with FIG. 1. The scanning mirrors 32,34 are controlled by signals on the lines 52 from the sinter control circuit 17, as discussed hereinbefore. The sinter control circuit 17 also controls the shutter 14 and the motor 70 in the same fashion as in FIG. 1.

The heating of the powder at the point 74 on the sintering bed 38 causes thermal radiation (or emissions) to be emitted radially outward, a portion of which is indicated by dotted lines 114. The thermal emissions are over a broad wavelength range including the near-infrared (IR), e.g., 1 to 1.8 micron wavelength, and the visible region. The thermal emission 114 from the point 74 on the sintering bed 38 is incident upon the scanning mirrors 32,34. The scanning mirrors 32,34 provide a reflected light beam 116 to the dichroic beamsplitter 110 which reflects the wavelengths of the radiated emissions as a divergent beam 118.

The beam 118 is incident on a focusing lens 120 which provides a focused light (radiation) 122 through an aperture 124 onto an optical infrared sensor photodetector 126. The lens 120 images the surface 68 of the powder bed onto a plane at the aperture 124. The photodetector 126 must be capable of measuring power in the wavelength range of the thermal emission 114, e.g., a germanium detector can detect radiation in the range of 1 to 1.8 microns. The aperture 124 may be removed, if desired, however, it prevents radiation from nearby spots on the sintering bed 38 from imaging onto the optical detector 126 thereby skewing the radiation reading.

The photodetector 126 provides an electrical signal on a line 128 to the power control circuit 104. The power control circuit 104 provides an electrical signal on the line 102 to adjust the power of the laser signal 106 and the power of the corresponding focussed beam 112. In particular, the power control circuit 104 provides an electrical signal on the line 102 to maintain the magnitude of the thermal emissions 114 from the sintered powder at a substantially constant level.

Figure 3:
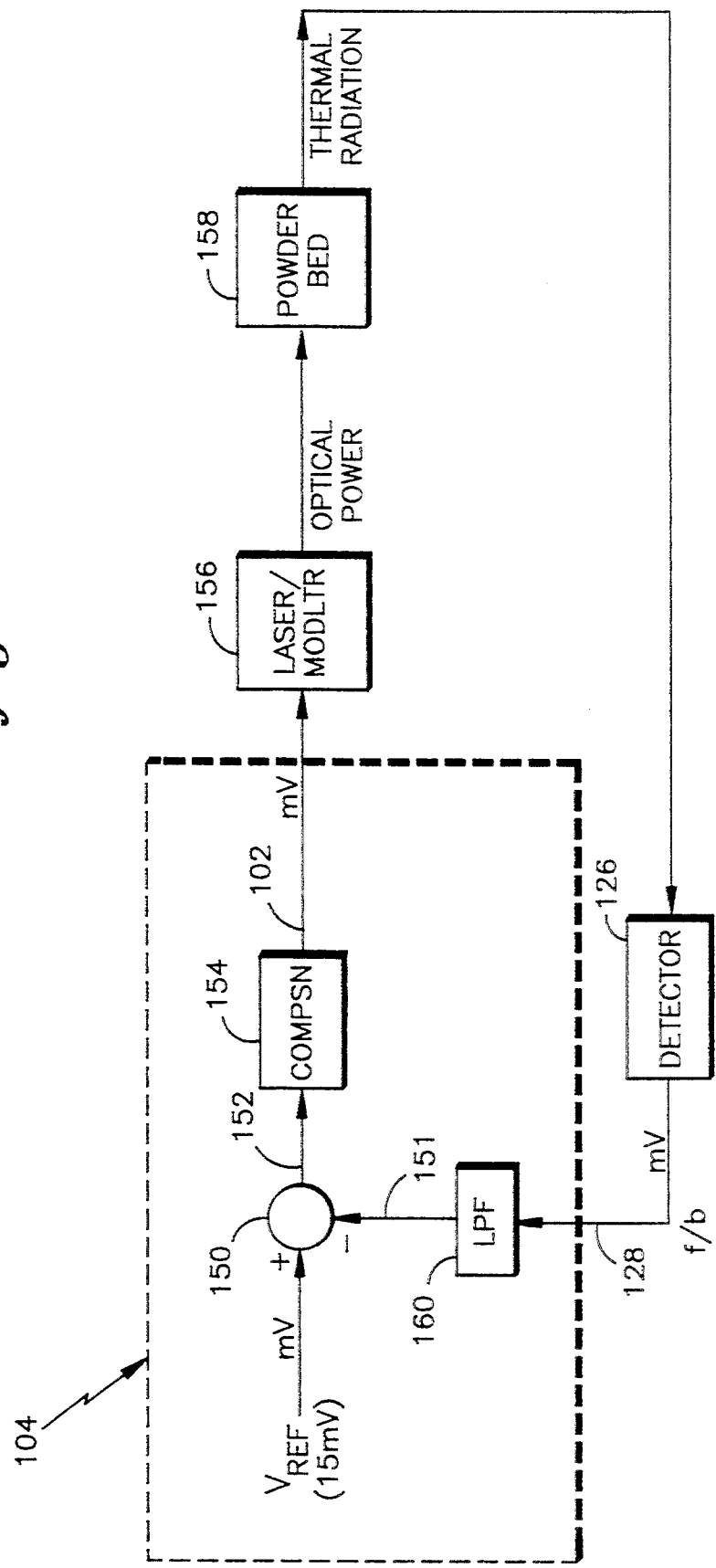
FIG. 3 is a schematic block diagram of a control system for thermal control of laser power in accordance with the present invention.

Referring now to FIG. 3, the control system block diagram for the power control circuit 104 and the plant being controlled, is as follows. The power control circuit 104 comprises a reference voltage $V_{Ref}$(millivolts) which is fed to a positive input of a summer 150. A filtered feedback signal is provided on a line 151 to a negative input of the summer 150. The output of the summer 150 is provided on a line 152 to known compensation 154, e.g., a proportional gain and bias. The control compensation 154 may be a simple gain and bias or a simple integrator or it may be more complicated as desired to produce the desired system response.

The output signal from the compensation 154 is provided on the line 102 and drives the modulator 100 (FIG. 1) which in turn adjusts the optical power of the laser light. For the sake of illustration, the laser 10 and the modulator 100 are shown as a single block 156 which represents the transfer function from millivolts from the power control circuit 104 to optical power from the laser beam 112 (FIG. 1). The optical power is incident on the powder bed 38 (FIG. 1) which is indicated, for the sake of illustration, as a block 158 (FIG. 3) representing the thermal transfer function of the powder bed 38 from input optical photons to output of thermal radiation.

The thermal radiation is detected by the detector 126 which provides a feedback signal in millivolts on the line 128 to a low pass filter 160 having a break frequency of, e.g., 1 KHz, in the power control circuit 104. The filter 160 filters out any high frequency noise on the feedback signal from the detector 126 and provides the filtered feedback signal on the line 151. Other filters or break frequencies may be used if desired. The output of the filter 160 is fed to the negative input of the summer 150 on the line 151, thereby providing negative feedback.

The power control circuit 104 contains known electric components, such as operational amps (op-amps) and transistors, to provide the functionality shown in the block diagram of FIG. 3. However, part of all of the power control 104 may instead be performed by the software of a digital computer.

Figure 4:
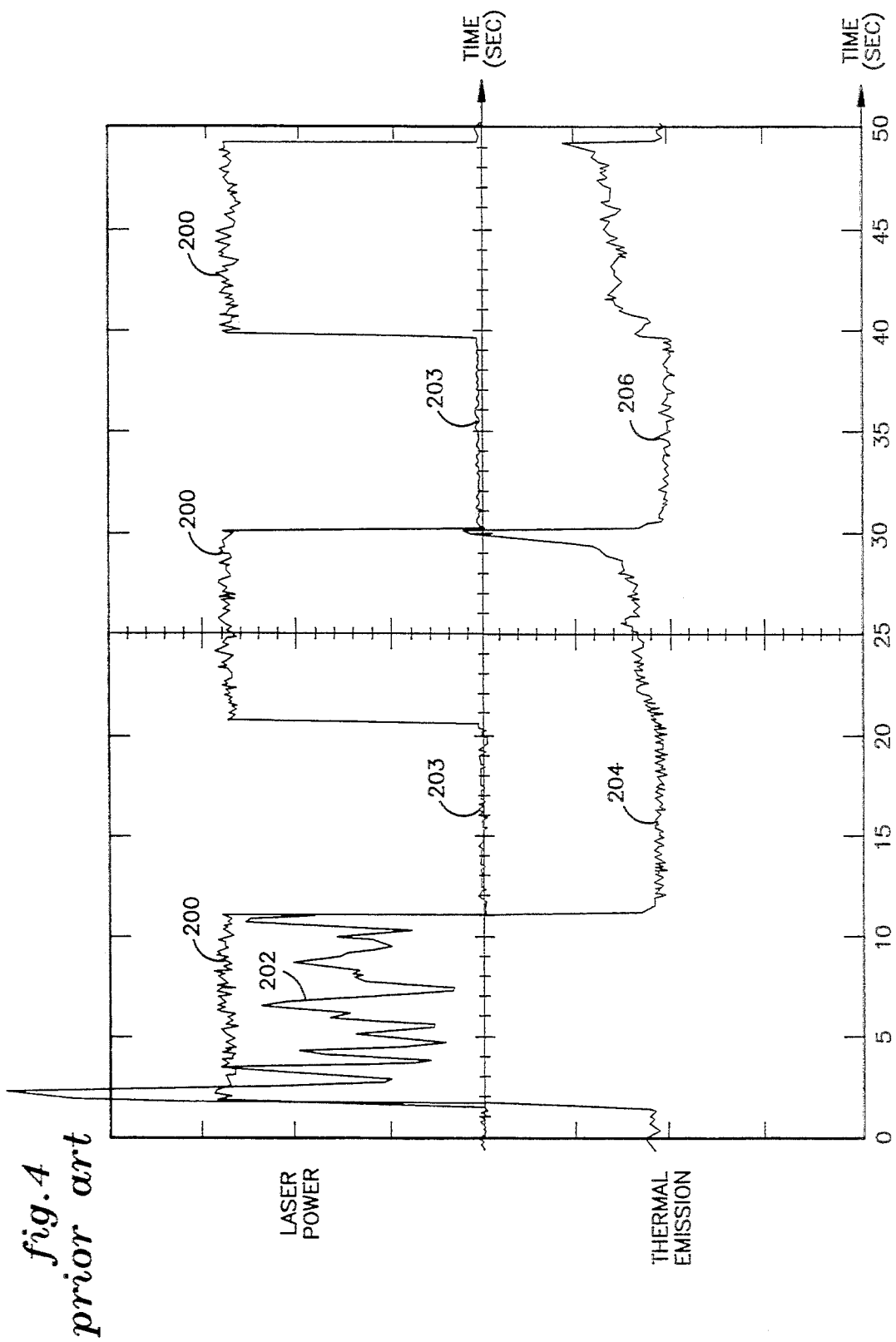
FIG. 4 is a graph of laser power versus time and thermal emission versus time for an open-loop configuration of the prior art.

Referring now to FIG. 4, when sintering is done in an open-loop configuration, as in the prior art of FIG. 1, the laser power remains substantially constant as indicated by a curve 200, and the thermal emission from the sintering location, as indicated by a curve 202, is initially quite erratic for the first scan across virgin powder in the powder bed. The low power levels 203 indicate when the laser is off between scans.

For the second scan across the powder bed, adjacent to the first scan, the thermal emission, as indicated by the curve 204, drops significantly and, thus, the temperature at the laser focused location 74 is much lower for the same laser power. For the third scan, the thermal emission, as indicated by a curve 206, increases slightly from the thermal emission of the second scan 204 due to the poor sintering from the second scan. However, again, this is much lower than the first scan 202 done over virgin powder. Note that in all three scans, the laser power 200 remained substantially the same. Also, the entire length of the scan was sintered (i.e., the laser was on) in these scan; however, in most applications the laser would be turned off a various points throughout the scan to make the desired shape of the part being created. The time scale for the scans was about 9 sec/scan; however, other scan rates may be used if desired.

The detector 126 (FIG. 1) should be designed so that it is not sensitive to the laser wavelength (e.g., 10.6 microns) to avoid significant signals due to optical reflection. Alternatively, an optical filter (not shown) can be provided in front of the optical detector 126 to filter out the laser wavelength to avoid sporadic noise and feedback signals due to reflections.

Figure 5:
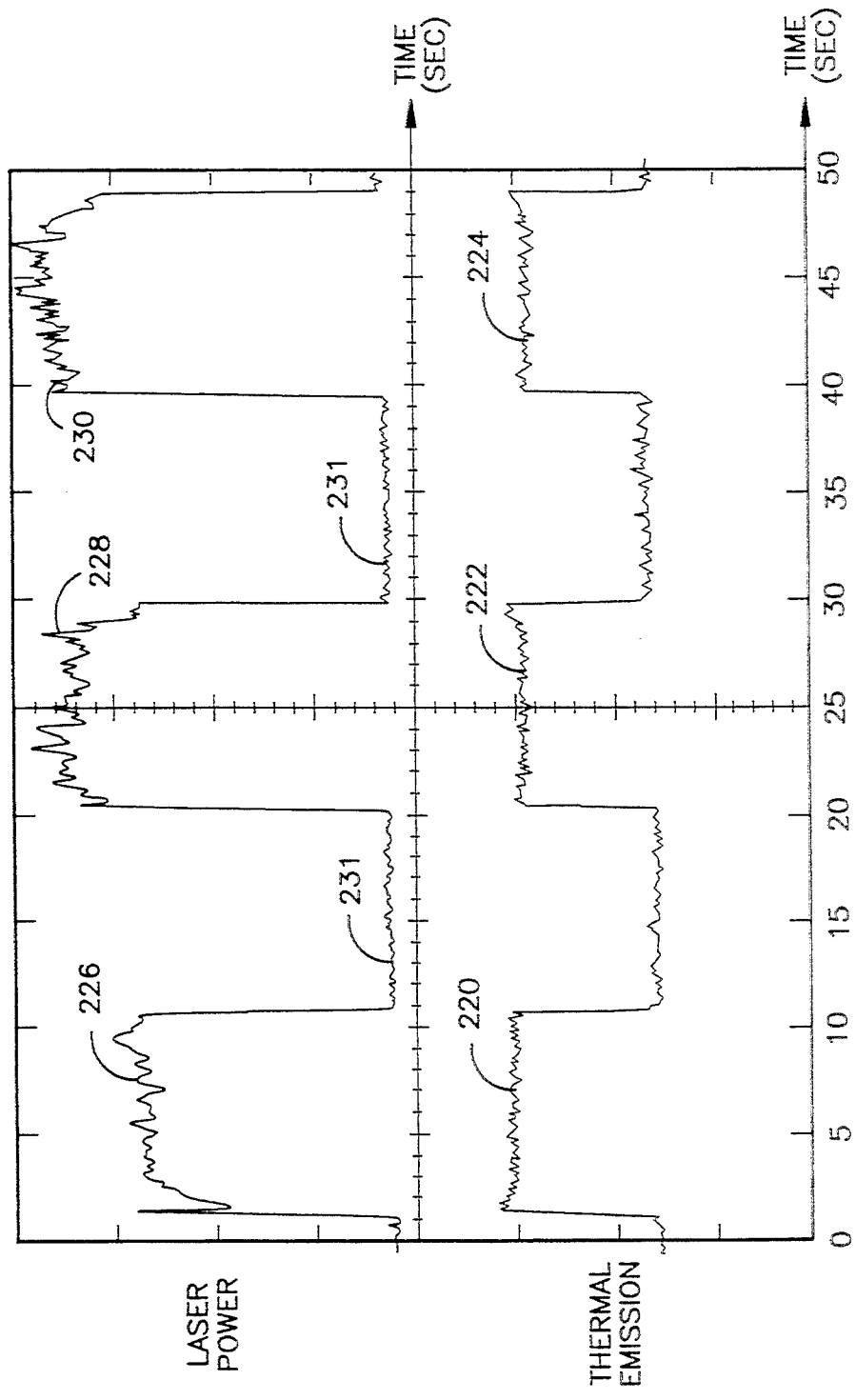
FIG. 5 is a graph of laser power versus time and thermal emission versus time for a closed-loop thermal emission control of laser power in accordance with the present invention.

Referring now to FIG. 5, in the closed-loop mode of the present invention, the electrical thermal emission signal 220,222,224 from the sensor 126 (FIG. 1) is substantially constant for each of the three scans and the laser power changes from the first scan 226 to the second scan 228 to the third scan 230 to adjust for changes in thermal conductivity and optical reflectivity of the surface being sintered. Consequently, the thermal emission from the surface is maintained substantially constant and, thus, the sintering process is maintained at a substantially constant temperature. The low power levels 231 indicate when the laser is off (or at a much lower power) between scans.

For the scans in FIGS. 4 and 5, the powder used was tungsten/copper mixture. Also, the three successive scans partially overlap. The diameter of each of the scans at the focal point 74 was about 0.012 inches and the overlap was about 0.002 inches. The type of detector used for the traces in FIGS. 4 and 5 was germanium.

Figure 6:
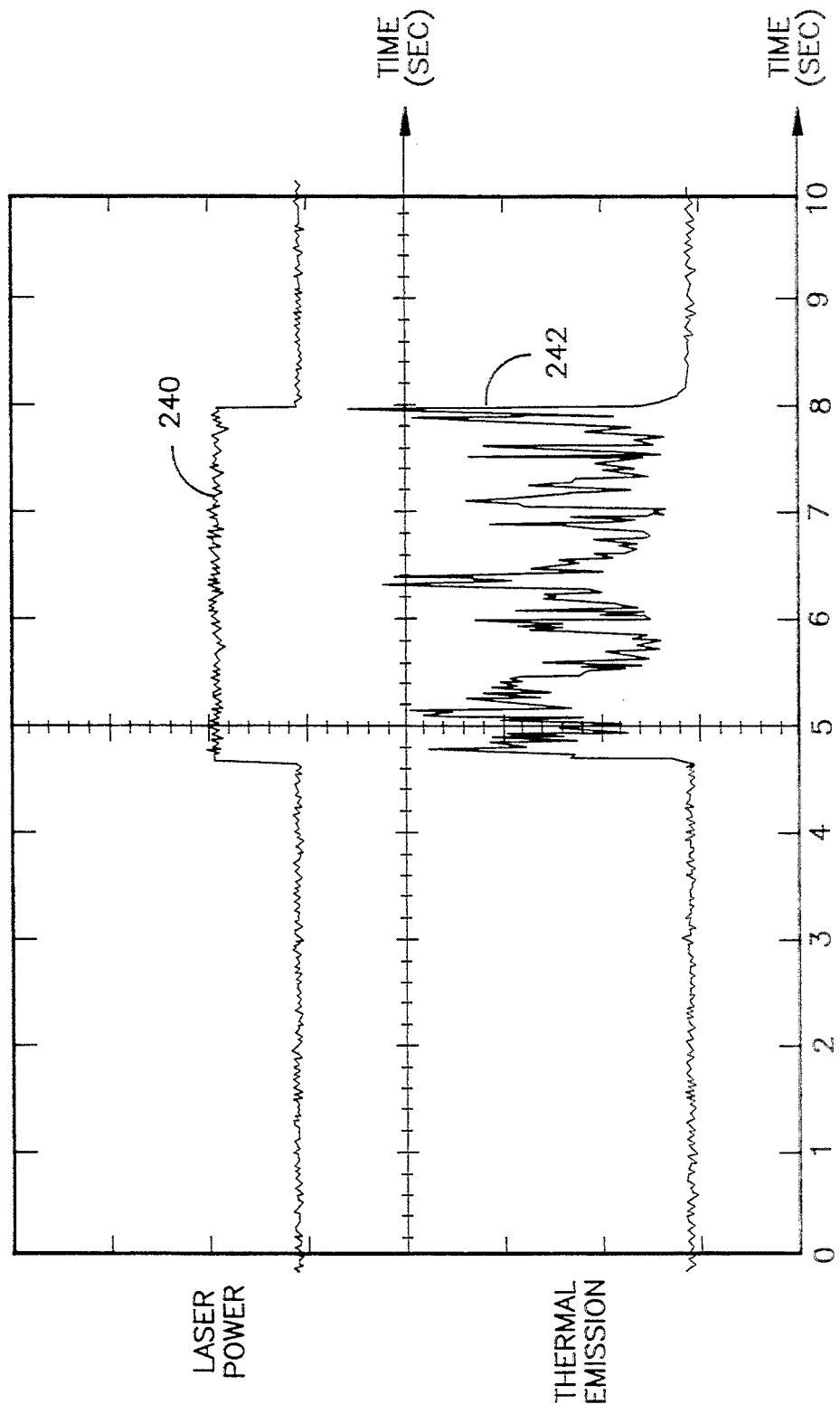
FIG. 6 is a graph of laser power versus time and thermal emission versus time for an aluminum silicate powder in an open-loop configuration of the prior art.

Referring now to FIG. 6, a single scan is shown for sintering in an open-loop configuration, as in the prior art of FIG. 1. The ON laser power is indicated by a trace 240 and the corresponding thermal radiation is indicated by a trace 242. This graph shows that the thermal radiation 242 is sporadic when the ON laser power 240 is substantially constant, when using the prior art configuration.

Figure 7:
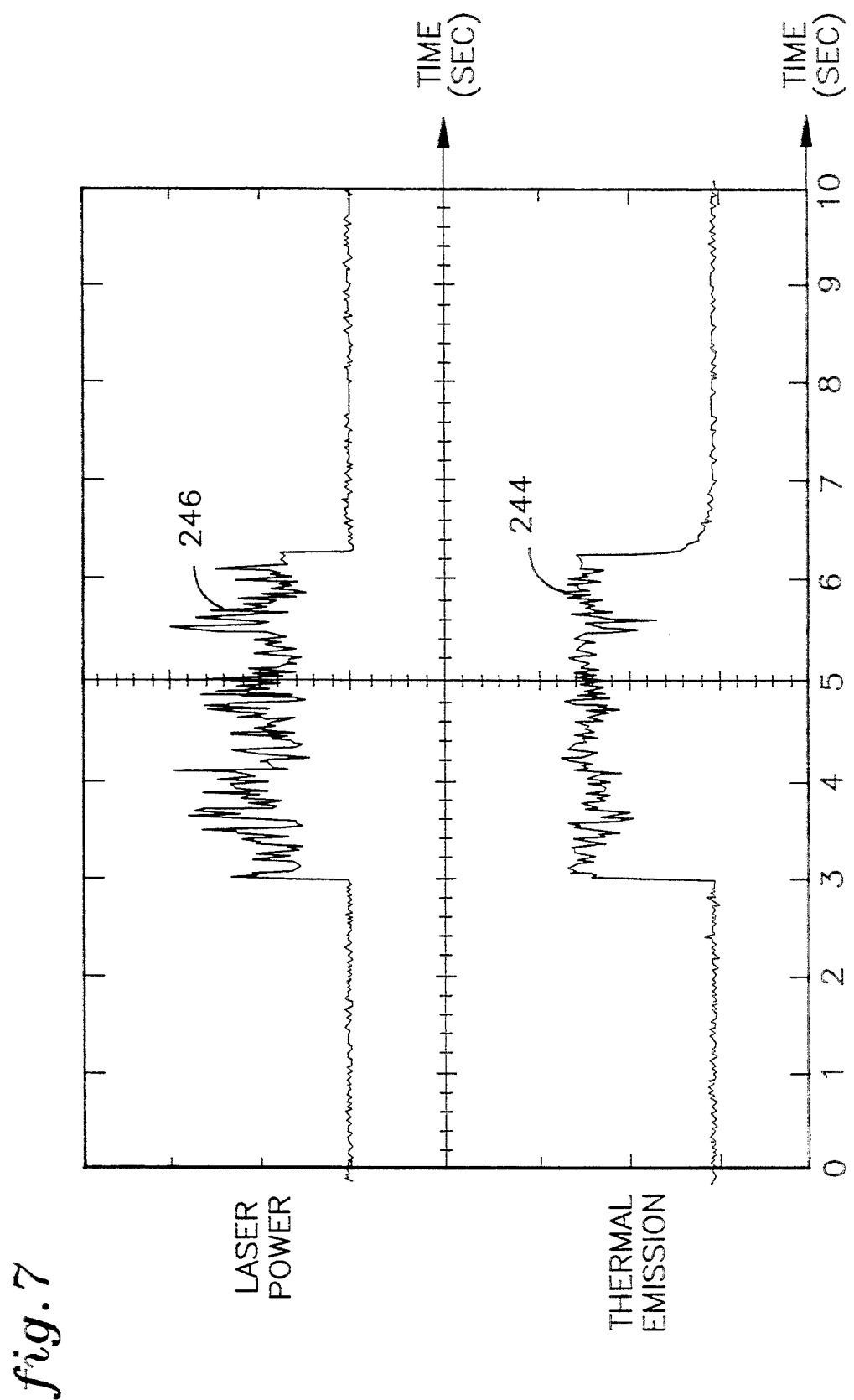
FIG. 7 is a graph of laser power versus time and thermal radiation versus time in a closed-loop thermal emission control of laser power in accordance with the present invention.

Referring now to FIG. 7, when in the closed-loop operation of the invention, the thermal radiation during the scan, indicated by a trace 244, is substantially constant and ON laser power, indicated by a trace 246, is adjusted to keep the corresponding thermal radiation 244 substantially constant. The experiments for FIGS. 6 and 7 were done with a aluminum silicate powder and the photodetector 126 was a germanium detector.

Figure 8:
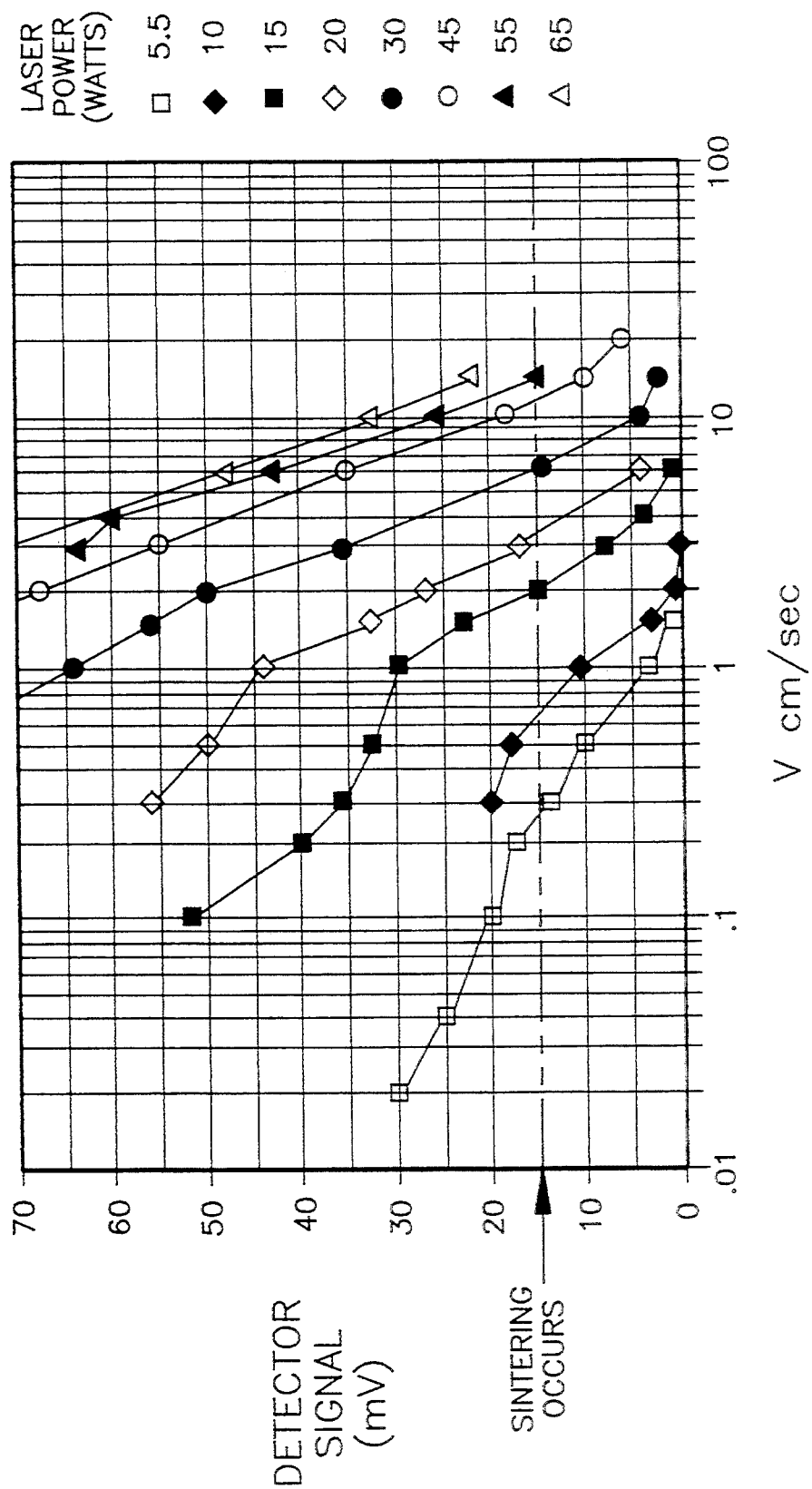
FIG. 8 is a graph of a detector signal versus scan speed for iron powder in an argon cover gas at a plurality of different laser powers in accordance with the present invention.

Referring now to FIG. 8, the magnitude of the detector signal at various laser powers and various scan speeds in an argon cover gas is recorded. We have found that with iron powder in a variety of cover gass, sintering occurs at approximately 15 millivolts for all the laser powers and all the scanning speeds indicated in the graph of FIG. 8. The presence of some remelted iron (i.e., iron powder which melted and then rehardened) indicates the temperature at a detector output voltage of 15 millivolts corresponds to about 1500 Deg. C., the melting point of iron.

Figure 9:
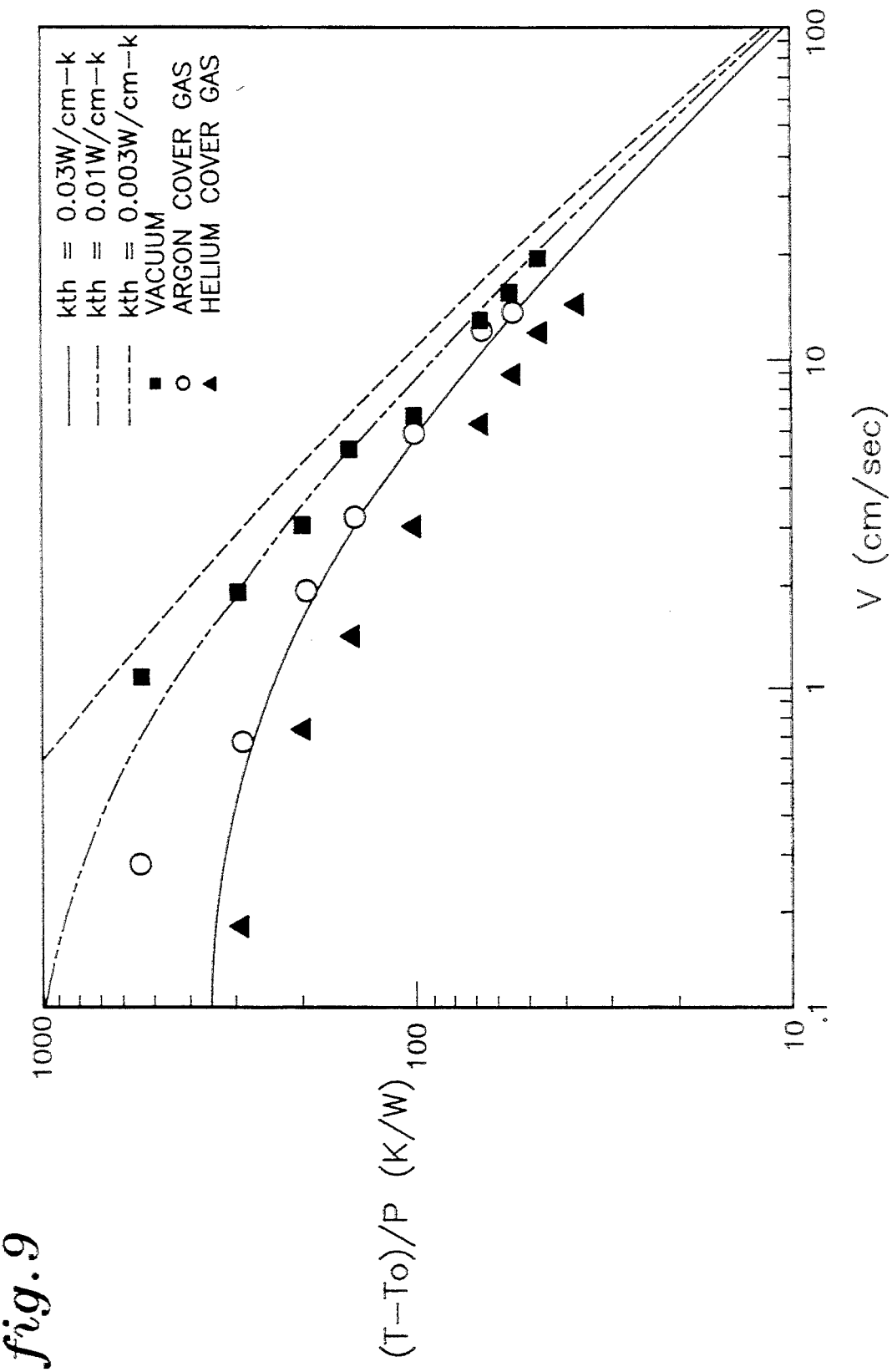
FIG. 9 is a graph of temperature rise per watt of optical power versus scan speed at a plurality of cover different gases showing both theoretical and measured data in accordance with the present invention.

Referring now to FIG. 9, depending on which gases exist in the chamber 60 (FIG. 1) will determine the temperature rise for a given laser power ($\Delta T/P$) because the powder has small pockets of the chamber gas between them. Thus, a gas which provides more thermal conductivity will give a smaller temperature rise for a given laser power at a given scan rate. Also, as the scan rate increases, the temperature rise per watt of optical power decreases. The graph of FIG. 9 shows a family of curves for a chamber gas of helium, argon and a vacuum in both theoretical (dashed and solid lines) and measured data (squares, circles and triangles).

The graph of FIG. 9 was derived from data of the type shown in FIG. 8, assuming that a 15 mv detector signal corresponded to 1500 Deg. C. The agreement between the empirical data and the theoretical curved indicate that the detector is indeed measuring thermal emission, and not some other phenomena. The magnitude and wavelength dependence of the radiation is also consistent with that of thermal emission. This was confirmed for a variety of materials. Also, the theoretical curves of FIG. 9 were derived based on published data of similar substances for the values of collective thermal conductivity (Kth) of the powder with the cover gas.

Although the invention has been shown as detecting the thermal radiation through the scanning mirrors by imaging the thermal radiation back through the scanning mirrors to an optical detector, it should be understood that any technique of measuring the temperature at the focal point of the focused beam on the powder bed at the point of sintering is acceptable.

For example, referring to FIGS. 10 and 11, instead of using variable pitch scanning mirrors, an X-Y plotter-type arrangement may be used to set the coordinates and scan the laser beam. In that case, directional optics are placed on a slidable housing 300 mounted to a rail 302 which allows the housing to move in the X-direction as indicated by the arrows 303 in FIGS. 10 and 11. Also, the rail 302 may move in the Y-direction as indicated by the arrows 304 in FIG. 11.

A collimated beam 305 from a laser source (not shown) is incident on a turning mirror (or flat) 306 (FIG. 11) and provides a reflected beam 307 which propagates along above the support rail 302. The beam 307 is incident on a focussing lens 308 which provides a focussed beam 310 to a turning mirror 312. The mirror 312 provides a reflected focussed beam 314 onto the surface of the sintering bed 38 (as in FIG. 1) at a focal point 315.

A detector housing 316 is attached to the movable housing 300 has a radiation detector 317 and a focussing lens 318 pointed at the focal point 315 of the focussed laser beam 314. The detector 317 detects radiated thermal emissions 320 from the point 315 imaged by the lens 318. Also, an aperture (not shown) may be used, as shown in FIG. 2, to prevent radiation from other points on the surface of the sintering bed 38 from being detected.

A sinter control circuit (not shown), controls the position of the beam on the sintering platform 38 by positioning of the housing 300 and the rail 302, and is well known in the art. Also, a power control circuit (not shown), similar to that of FIG. 2, is essentially the same and provides the same function as that discussed hereinbefore, i.e., it monitors the detection signal on the line 128 from the detector 317 and provides a power control signal to control the power of the focussed laser beam 314. The detector may be the same as that discussed hereinbefore with FIG. 2.

Also, instead of moving the mirrors, the sintering platform itself may be moved in one or a plurality of horizontal directions.

The invention may be used with any type of sintering material, e.g., plastic, wax, metals, ceramics, and others. Also two or more material powder components may be used, e.g., metal-bronze. Further, instead of using a convergent (focussed) beam for the beam 36 to perform sintering, a collimated beam may be used provided the power level is high enough and the beam diameter is small enough to provide sintering.

Even though the modulator 100, the shutter 14, and the laser 10 are shown as being separate components in FIG. 2, it should be understood that some or all of these components may be contained in a single laser package which provides power level control and/or fast on/off beam control.

Also, instead of detecting the temperature exactly at the focal point of the laser, the detector may detect the temperature at points either in front of, behind, or to the side of the focal point to help predict or otherwise determine the appropriate power for the laser beam to provide the desired sintering.

Further, although the invention has been described as detecting temperature based on the detection of thermal radiation, it should be understood that instead of or in addition to detecting thermal radiation other parameters may be detected that relate to temperature, e.g., a plasma (laser-excited atomic states of the cover gas that radiate emissions during energy decay) or a plume (vaporized or particulate material emitted from powder surface that glows due to heat or florescence).

Although the invention has been described and illustrated with respect to the exemplary embodiments thereof, it should be understood by those skilled in the art that the foregoing and various other changes, omissions and additions may be made without departing from the spirit and scope of the invention.

We claim:

1. A method of laser sintering, comprising the steps of:

directing a laser beam onto a surface of a powder to be sintered; and detecting the temperature of said powder at a mobile detection point which tracks near said sintering location.

2. The method of claim 1 further comprising the step of adjusting the power of said laser in response to said temperature.

3. The method of claim 2 wherein said step of adjusting the power of said laser comprises adjusting the power of said laser beam so as to maintain said temperature at a substantially constant level.

4. The method of claim 1 wherein said step of detecting temperature comprises detecting radiated thermal emissions from said detection point.

5. The method of claim 4 further comprising the step of directing said radiated thermal emissions to said detection means.

6. The method of claim 4 further comprising the steps of:

scanning said laser beam across said powder; and directing said radiated thermal emissions to said detection means.

7. The method of claim 1 further comprising a step of focussing said laser beam onto said surface of said powder.

* * * * *